Patented Jan. 8, 1935

1,986,936

UNITED STATES PATENT OFFICE 1,986,936

POLISHING COMPOSITION

William W. Lewers, Flint, Mich., assignor to E. I. du Pont de Nemours & Company, Wilmington, Del., a corporation of Delaware No Drawing. Application March 7, 1930, Serial No. 434,156

3 Claims. (Cl. 134—24)

This invention relates to polishing compositions and more particularly to a composition adapted to polish automobiles, floors, furniture and the like.

The most efficacious of the polishing compositions for imparting a high and durable polish to woodwork automobiles and the like are waxes alone, or as is most usually the case, a solid solution of a wax or a composition containing a wax, in an organic solvent. These polishes are, however, laborious and time consuming in application because of the fact that they are solids and require a large amount of rubbing to bring out the high polish inherent in the composition. In order to obviate this difficulty various liquid or semi-liquid polishing compositions have been produced, but insofar as I am aware these compositions, although easy of application, do not give the hard lasting finish obtained by the solid wax-like polishing compositions.

This invention has as an object a polishing composition that is easily applied and has the desirable polishing qualities of the solid wax-like polishing compositions.

This object is accomplished by the following invention in which a wax or wax-like polishing composition is converted into an emulsion of convenient consistency by means of water and an emulsifying agent. The wax is preferably mixed with a softening agent and a solution of the mixture in an organic solvent is emulsified with water by the aid of an emulsifying agent which not only contributes to the stability of the product but which will cause the formation of an emulsion in which the water is the dispersed phase and the wax solution is the disperse phase.

The polishing composition may be made from the following ingredients in the proportions indicated.

*Example I*

| | Parts |
|---|---|
| Carnauba wax | 30 |
| Paraffin | 20 |
| Naphtha (B. P. range 150–216° C.) | 120 |
| Heavy mineral oil | 4 |
| Petroleum base sulfonic acid | 10 |
| Water | 300 |

*Example II*

| | Parts |
|---|---|
| Carnauba wax | 30 |
| Paraffin | 20 |
| Naphtha (B. P. range 150–216° C.) | 120 |
| Heavy mineral oil | 4 |
| Castor oil mono glyceride | 10 |
| Water | 300 |

The carnauba wax contributes toughness and weathering resistance to the composition while the paraffin lends softness and flexibility to the carnauba wax and also acts as a water repellent for the polish film. The naphtha and the mineral oil, which may be high grade crank case oil, function as a solvent for the wax and paraffin. White paraffin having a melting point at 120° F. and containing no foreign matter was used in the above examples. The mineral oil used was a neutral one having a specific gravity between 0.844 and 0.850 at 15.5° C.

The ingredients for the polishing compositions such as those set forth above are preferably emulsified by a method which produces a homogenized emulsion and the emulsifying agent, exemplified by the petroleum base sulfonic acid and the castor oil monoglyceride, is one which will cause the formation of an emulsion of the water in the hydrocarbon solution of the wax.

By the term "homogenized emulsion" I mean the more viscous and more stable type of emulsion in which the dispersed particles are smaller and more nearly the same size than those in non-homogenized emulsions.

By the term "a water in oil emulsion" I mean an emulsion in which the water particles are dispersed in a hydrocarbon solution of wax or wax-like material. In this type of emulsion the water particles or globules are the dispersed phase and the hydrocarbon solution of wax is the enveloping disperse phase.

Methods of special applicability for the production of emulsions resulting in my improved polishing composition are as follows:

The wax is placed in a suitable kettle equipped with a heating device. Heat is applied and at the same time the mineral oil and thinner (the naphtha) is added. The mixture is heated to about 70° C. until the material is in solution and is a homogenous liquid. The emulsifying agent is then added and stirred well into the mixture. The water is heated in a separate vessel and is added to the mixture of organic materials at the temperature of the latter while stirring. After the mixture of waxes and water appears homogenous which denotes partial emulsification, the partially formed emulsion is passed through a steam jacketed colloid mill maintained at constant temperature. After passing through the colloid mill the material is fed into a tank where it is allowed to cool to a point within the temperature range of about 20° C. to about 30° C., the material being mechanically agitated during the cooling. The cooling must be gradual with no sharp breaks in temperature, otherwise the emulsion will not be smooth but will be grainy with decreased stability.

Another method somewhat more expensive in practice than the above because of the requirements of mechanical control is as follows:

The melted wax is brought into solution with the mineral oil, thinner and emulsifying agent as above by heating at about 70° C. in a tank The water is heated in another tank to the same temperature and a stream of the material from each tank is run into the colloid mill concurrently, the ratio of the water to the other materials passing through the mill at any one time being the same as the ratio of the water to the other materials in the finished product.

In both of the above methods of forming the emulsion it is important that the solution of the wax, oil, thinner and emulsifying agent be effected within the proper temperature range. Crystallization of the wax takes place below 57° C. and as the temperature approaches 100° C. an excessive evaporation of the volatile constituents takes place. Temperatures between the range of 60 to 90° C. may be used satisfactorily but a temperature of about 70° C. is preferred.

The petroleum base sulphonic acid is also known as sludge acid and for the use of this agent as an emulsifying agent it is simply necessary to remove the free sulphuric acid, extensive purification methods for the removal of organic matter being unnecessary for the present purpose as this matter simply blends and becomes a part of the similar material of the organic portion of the composition. The organic sulfonic acids comprehended by the term petroleum base sulfonic acid as used herein are with respect to oil and water constituents of an emulsion, more readily soluble in the oil phase than in the water phase, produce the water in oil type of emulsion, and are formed by the action of concentrated sulphuric acid or sulphuric acid anhydride upon crude petroleum, the distillates or the like as has long been known.

The product made of the materials set forth has the color and consistency of thick cream. The composition is stable and undergoes no detrimental physical or chemical change when frozen.

The proportions given in the example may be varied considerably and other ingredients having similar characteristics may be substituted for those mentioned. The quantity of the paraffin or other softening agent will depend upon the character of the polishing wax used. The kind and quantity of the solvent as exemplified by the naphtha and mineral oil is dependent upon the particular waxy constituents used. The emulsifying agent preferably constitutes about two per cent of the composition, but may vary from approximately ¼% to 5% or more. The waxes suitable for my improved polishing composition are those waxes defined as esters of monohydric alcohols, and any of the other naturally occurring waxes suitable for polishing, as candelilla wax, may be used. The softening agent is preferably the high boiling solid paraffin rather than the readily liquefiable paraffins known as petroleum jelly. From the class known to the trade as mineral waxes, bleached ozokerite, (ceresine) may be mentioned as a desirable substitute for ordinary paraffin. Solvents for the waxy ingredients other than naphtha and mineral oil may be used and the selection of solvent is determined conjointly by the solvent properties, the consistency imparted to the wax dissolved composition and the emulsifying capability imparted to the composition.

I prefer that the composition comprise about 60 parts of water to 40 parts of the other materials. The emulsion may contain 70% or more of water but the proportion of wax is then too small for satisfactory use. On the other hand the percentage of water in the emulsion may be considerably lower as 20% or even 1% but as the percentage of water drops the composition has a tendency to stick and gum when applied and otherwise begins to take on the undesirable characteristics of the conventional wax polishing compositions. The climate in which the composition is used may also, to some extent, determine the proportion of water present in the composition. In hotter climates more water may be used because of its faster evaporation during application of the polish and proportionally less water may be used in colder climates.

Various emulsifying agents other than those mentioned in the examples may be used to produce a water in oil type of emulsion for the production of my improved polishing composition. Some of these agents are: ammonium oleate, ammonium linoleate, and the ammonium salts of the linseed oil acids, sodium oleate, the sodium salts of China-wood oil acids or castor oil acids, respectively, the ammonium salts of China-wood oil acids, tri-ethanolamine oleate. The mono glycerides of the non-drying oils as exemplified by the castor oil mono glyceride mentioned in the example furnish efficient emulsifying agents. The mono glycerides of drying oils as linseed oil, China-wood oil and perilla oil also furnish emulsifying agents. In general these agents are the mono glycerides of saturated or unsaturated organic acids of the type present in drying, semi- and non-drying oils and the oils reacted with glycerol to form the mono glyceride emulsifying agents are the tri-glycerides of these acids. Among various other emulsifying agents are the calcium soap of Turkey red oil or the calcium salt of oleic acid. The preferred agents are, however, a petroleum base sulfonic acid, which includes not only the acid itself but those salts and derivatives of the sulfonic acid that are adapted for the production of the emulsion, such as the calcium salt of petroleum base sulfonic acid or the sodium salt.

Equilibrium of an emulsion depends upon the relative proportion of positive and negative ions adsorbed by the stabilizing film around the dispersed globules. When the positive ions are in excess a water in oil type of emulsion is favored while an excess of negative ions has the reverse effect. For the present purpose the agent selected should be capable of forming a stable water in oil type of emulsion and it has been my experience in general that the agents capable of producing this type of emulsion are more readily soluble in the oil phase than in the water phase. The fact that my emulsified polishing composition is of the water in oil type is shown by the following tests: If it is attempted to mix water with the emulsified product at ordinary temperatures it is found that the emulsion and the water will not mix. Kerosene will, however, mix with the emulsion from which it is concluded that the oil is the outside phase. Similarly an oil soluble dye placed on the surface of the emulsion imparts its color to the emulsion whereas if the dye is soluble in water only the color does not spread into the emulsion as in the case of the oil soluble dye.

While I find it possible to form an emulsified product with the aid of mechanical means and a colloid mill alone, the emulsion is unstable as it finally separates into an aqueous and organic layer and is therefore unsuitable for commercial use.

Because of the fact that my improved polishing composition is in the form of an emulsion it embodies the advantages of the solid wax composition in that it is capable of producing a hard lustrous polish and at the same time it is free from the disadvantages incident to the time and labor usually expended in applying a wax polish. Because of its semi-plastic liquid state it is easily applied and the wax may be quickly spread over the surface to be polished. In addition to the advantages incident to the fact that my improved polishing composition is an emulsion, it has a further important advantage because of the fact that it is an emulsion of the water in oil type. This is apparent when it is remembered that the wax is the ingredient that it is desired to apply and it is this ingredient that first touches and tends to adhere to the surface to be polished when my emulsified polishing composition is used. Were the emulsion of the reverse or an oil in water type of emulsion, the water would act as a film tending to separate the oil, in which the wax is dissolved, and prevent the ready adherence of the wax to the surface to be polished. It is possible that the emulsion formed as described herein is a multiple emulsion wherein each of the water droplets contain an emulsion of the oil therein. This secondary oil in water emulsion in which oil is dispersed in the water particles does not, however, alter the fact that the emulsion as a whole is of the water in oil type. While the operativeness of the product is not dependent upon the fact that the emulsion is of the homogenized and viscous type, an emulsion of this type does, however, confer valuable characteristics to the emulsified polishing composition. The increased viscosity lends stability to the emulsion because with high viscosity there is more hindrance or resistance offered to the coalescence of the dispersed globules. My improved polishing composition has also marked advantages over a liquid polishing composition in which the wax is merely dissolved in an organic solvent. Except for a few of the more expensive solvents the solution will not, at ordinary temperatures, dissolve sufficient wax to be effective. Further, such solutions do not have the freedom from gumming and streaking as my improved water in oil emulsified composition.

As many apparent and widely different embodiments of this invention may be made without departing from the spirit thereof, it is to be understood that I do not limit myself to the foregoing examples or description except as indicated in the following claims.

I claim:

1. An emulsified polishing composition consisting of a water in oil emulsion of water with a solution of wax in organic solvent, said composition having the following approximate formula:

| | Parts |
|---|---|
| Carnauba wax | 30 |
| Paraffin | 20 |
| Naphtha | 120 |
| Heavy mineral oil | 4 |
| Petroleum base sulphonic acid soluble in petroleum hydrocarbon solvents | 10 |
| Water | 300 |

2. A polishing composition comprising water, a polishing wax, a softener, water insoluble organic solvent for said wax and softener, and an emulsifying agent more readily soluble in said organic solvent than in water, said composition being an emulsion of the water and a solution in the organic solvent of the polishing wax and softener, said emulsion being of the water in oil type in which the water is the dispersed phase and said solution of wax and softener in the organic solvent is the disperse phase, the polishing wax in said composition consisting preponderately of a wax selected from the class consisting of carnauba wax and candelilla wax, said softener being one of the class consisting of paraffin and mineral wax.

3. The polishing composition set forth in claim 2 in which said organic solvent is naphtha having a boiling range of 150° C. to 216° C.

WILLIAM W. LEWERS.